United States Patent
Kinoshita et al.

(10) Patent No.: US 6,943,940 B2
(45) Date of Patent: Sep. 13, 2005

(54) OPTICAL AMPLIFIER FOR AMPLIFYING A WAVELENGTH DIVISION MULTIPLEXED (WDM) LIGHT INCLUDING LIGHT IN DIFFERENT WAVELENGTH BANDS

(75) Inventors: Susumu Kinoshita, Kawasaki (JP); Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 10/322,584

(22) Filed: Dec. 19, 2002

(65) Prior Publication Data

US 2003/0123142 A1 Jul. 3, 2003

Related U.S. Application Data

(62) Division of application No. 09/382,701, filed on Aug. 23, 1999, now Pat. No. 6,768,578.

(51) Int. Cl.[7] .................................................. H01S 3/00
(52) U.S. Cl. ..................................... 359/349; 359/337.4
(58) Field of Search .............................. 359/337.4, 349

(56) References Cited

U.S. PATENT DOCUMENTS

| | | | | |
|---|---|---|---|---|
| 5,539,563 | A | | 7/1996 | Park ........................... 398/148 |
| 5,559,920 | A | * | 9/1996 | Chraplyvy et al. ......... 385/123 |
| 5,664,131 | A | | 9/1997 | Sugiya .................. 359/337.13 |
| 5,831,754 | A | | 11/1998 | Nakano ....................... 398/158 |
| 5,880,876 | A | | 3/1999 | Kikuchi et al. ........... 354/337.5 |
| 6,049,418 | A | * | 4/2000 | Srivastava et al. ........ 359/337.4 |
| 6,055,092 | A | | 4/2000 | Sugaya et al. .............. 359/337 |
| 6,061,171 | A | * | 5/2000 | Taylor et al. ............. 359/337.1 |
| 6,104,527 | A | | 8/2000 | Yang ..................... 359/341.33 |
| 6,137,604 | A | | 10/2000 | Bergano ........................ 398/1 |
| 6,157,477 | A | | 12/2000 | Robinson .................... 398/147 |
| 6,195,480 | B1 | | 2/2001 | Kosaka et al. ................ 385/24 |
| 6,243,176 | B1 | | 6/2001 | Ishikawa et al. ............ 398/141 |
| 6,377,375 | B1 | | 4/2002 | Taga et al. ..................... 398/92 |
| 6,384,943 | B2 | | 5/2002 | Ishikawa et al. .............. 398/79 |
| 6,417,945 | B2 | | 7/2002 | Ishikawa et al. .............. 398/79 |
| 2002/0027703 | A1 | | 3/2002 | Kinoshita et al. ........ 359/337.1 |
| 2002/0051284 | A1 | | 5/2002 | Takatsu et al. .......... 359/341.1 |

FOREIGN PATENT DOCUMENTS

| | | | |
|---|---|---|---|
| JP | 7-107069 | 4/1995 | ........... H04S/14/00 |
| JP | 8-248455 | 9/1996 | ............. G02F/1/35 |
| JP | 8-255940 | 10/1996 | ............. H01S/3/07 |
| JP | 409023187 A | 1/1997 | ........... H04B/10/02 |
| JP | 09236834 A | 9/1997 | ............. G02F/1/35 |
| JP | 410126385 A | 5/1998 | ............ H04J/14/00 |

OTHER PUBLICATIONS

Sun et al., "80nm ultra–wideband erbium–doped silica fibre amplifier," Electronics Letters, Nov. 6, 1997, vol. 33, No. 23, pp. 1965–1967.

(Continued)

*Primary Examiner*—Bernarr E. Gregory
*Assistant Examiner*—Deandra M. Hughes
(74) *Attorney, Agent, or Firm*—Staas & Halsey LLP

(57) ABSTRACT

An optical amplifier, or optical repeater, for amplifying wavelength division multiplexed (WDM) light. A first demultiplexer demultiplexes the WDM light into first and second lights corresponding to different wavelengths in the WDM light. First and second optical amplifiers amplify the first and second lights, respectively. A first multiplexer multiplexes the amplified first and second lights into a multiplexed light. A dispersion compensator compensates for dispersion in the multiplexed light. A second demultiplexer demultiplexes the dispersion compensated, multiplexed light into the first and second lights. Third and fourth optical amplifiers amplify the demultiplexed first and second lights, respectively. A second multiplexer multiplexes the amplified first and second lights from the third and fourth optical amplifiers into a WDM light. The optical amplifier can be configured so that the first and second lights travel through the dispersion compensator in opposite directions.

2 Claims, 12 Drawing Sheets

OTHER PUBLICATIONS

Susumu Kinoshita et al., "Large Capacity WDM Transmission Based on Wideband Eribium–Doped Fiber Amplifiers," OOA '98, Jul. 27–29, pp. MD1–4/54–57.

Susumu Kinoshita et al., "Wide–Dynamic–Range WDM Optical Fiber Amplifiers For 32x10 Gb/s, SMF Transmission Systems," OAA '98, Jul. 27–29, pp. 173–176, 1998.

Sun, Y., et al., "A Gain–flattened Ultra Wide Band EDFA for High Capacity WDM Optical Communications Systems," ECOC '98, Sep. 20–24, 1998.

Yan Sun et al., "Optical Fiber Amplifiers for WDM Optical Networks", Bell Labs Technical Journal, Optical Networking, Jan.–Mar. 1999, vol. 4, no. 1, pp. 187–206.

Yan Sun et al., "A Gain–Flattened Ultra Wide Band EDFA For High Capacity WDM Optical Communications Systems", ECOC '98, Sep. 20–24, 1998.

Yan Sun et al., "An 80nm Ultra Wide Band EDFA with low Noise Figure and High Output Power," 11$^{th}$ International Conference on Integrated Optics and Optical Fiber Communications, 23$^{rd}$ European Conference on Optical Communications, IOOC/ECOC '97, Sep. 1997, vol. 5, Conference Publication No. 448, pp. 69–72, 1997.

Yan Sun et al., "Ultra Wide Band Erbium Doped Silica Fiber Amplifier with 80nm of Bandwidth," Optical Amplifiers and Their Applications, Optical Society of America (OSA), Jul. 21–23, 1997, pp. PD2–2–4.

Srivastava, A.K., et al., "1Tb/s Transmission of 100 WDM 10 Gb/s Channels Over 400 km of TrueWave™ Fiber," Bell Laboratories, Lucent Technologies, Holmdel, NJ, OFC '98 pp. PD10–1 through PD10–4.

Sun, Yan, et al., "Ultra Wide Band Erbium–Doped Silica Fiber Amplifier with 80 nm of Bandwidth," Optical Amplifiers and Their Applications, Optical Society of America (OSA), Jul. 21–23, 1997, pp. PD2–2 through PD2–5.

Taga, Hidenori, et al., "A Half Tbit/s (50x10.66Gbit/s), Over 1600km Transmission Experiment Using Widely Gain–flattened EDFA Chain," ECOC '97, 11th Intl. Conf. On Integrated Optics and Optical Fibre Communications, vol. 5—Post Deadline Papers, Sep. 25, 1997, pp. 13–16.

* cited by examiner

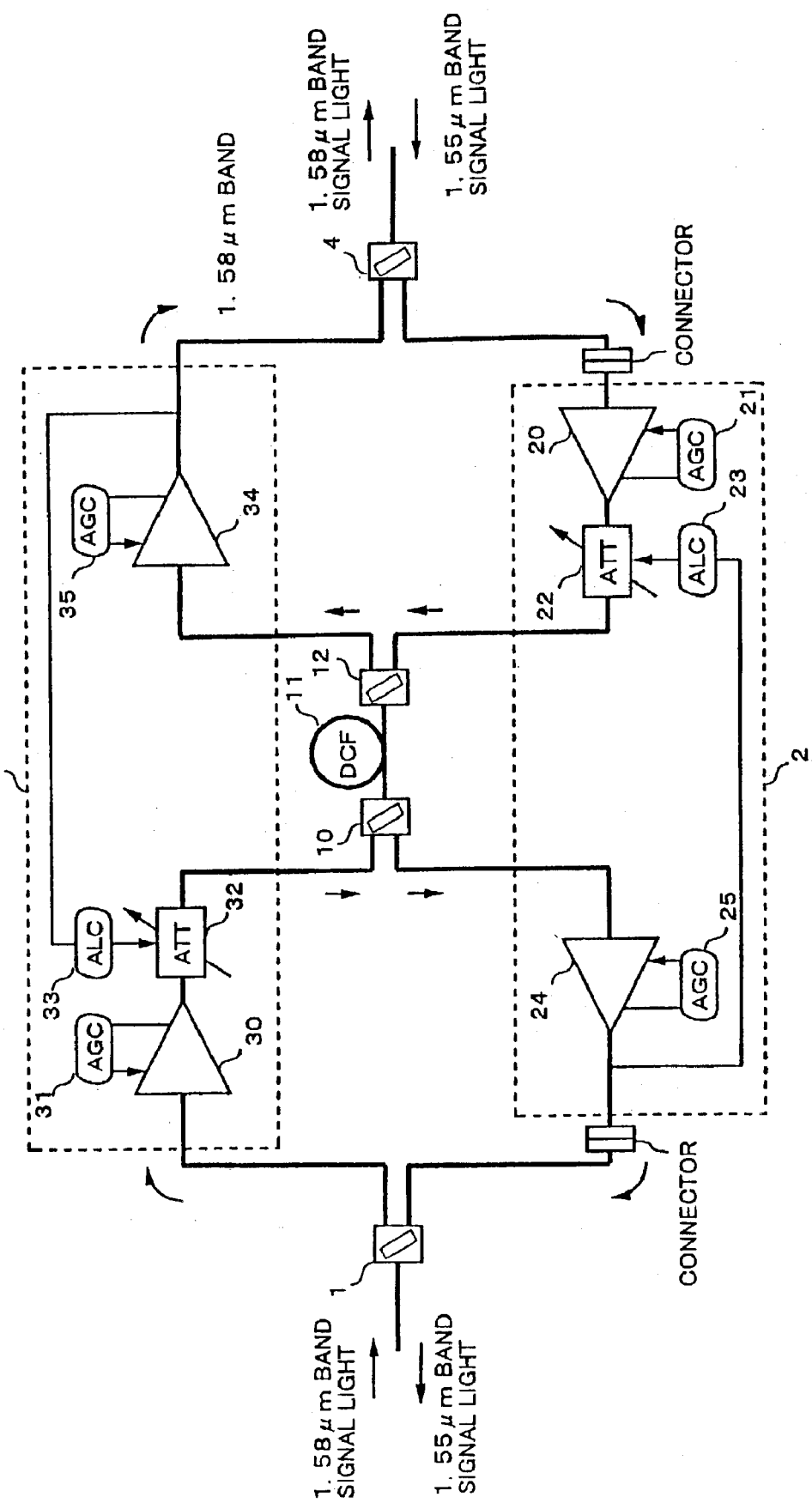

OPTICAL AMPLIFIER FOR AMPLIFYING A WAVELENGTH DIVISION MULTIPLEXED (WDM) LIGHT INCLUDING LIGHT IN DIFFERENT WAVELENGTH BANDS

CROSS-REFERENCE TO RELATED APPLICATIONS

This is a divisional of application Ser. No. 09/382,701, filed Aug. 23, 1999, now U.S. Pat. No. 6,768,578.

This application is based on, and claims priority to, Japanese application 10-249658, filed Sep. 3, 1998, in Japan, and which is incorporated herein by reference.

BACKGROUND OF THE INVENTION

1. Field of the Invention

The present invention relates to an optical amplifier and optical amplification method for amplifying wavelength division multiplexed (WDM) light which includes light in different wavelength bands.

2. Description of the Related Art

Research and development in the area of wavelength division multiplexed (WDM) optical communication systems has resulted in a steady increase in the number of wavelengths being multiplexed together. In addition, the wavelength bands for transmission are being widened.

Furthermore, research and development is also advancing the development of WDM optical communication systems which utilize optical amplifiers as linear repeaters. With such WDM optical communication systems, a plurality of signal lights in a wavelength band of, for example, 1.53 to 1.56 μm (hereinafter referred to as a 1.55 μm band), can be collectively amplified with an optical amplifier, thereby enabling large-capacity and long-distance light transmission with a simple construction.

In addition, optical communication systems which address band expansion of an optical amplifier have also been proposed. For example, optical amplifiers which can amplify signal lights in a long wavelength band of, for example, 1.57 to 1.60 μm (hereinafter referred to as a 1.58 μm band) have been proposed.

For example, FIG. 1 is a diagram showing a conventional optical amplifier for amplifying WDM signal light which includes both signal light in a 1.55 μm band (1.53 to 1.56 μm) and signal light in a 1.58 μm band (1.57 to 1.60 μm). With typical optical amplifiers, in particular optical fiber amplifiers, it is difficult to obtain an equal gain over a wide band exceeding 60 nm. Therefore, the optical amplifier in FIG. 1 divides the WDM signal light into, for example, two bands of 1.55 μm and 1.58 μm, and obtains equal gains over the respective bands.

Referring now to FIG. 1, WDM signal light from a single optical fiber is demultiplexed by a WDM coupler 1 into WDM signal lights of a 1.55 μm band and a 1.58 μm band. Then, the WDM signal lights of the 1.55 μm band and the 1.58 μm band are directed to a 1.55 μm band optical fiber amplifier section 2 and a 1.58 μm band optical fiber amplifier section 3, respectively. The respective WDM signal lights amplified by optical fiber amplifier sections 2 and 3 are then multiplexed in a WDM coupler 4, and output to a single optical fiber.

However, various problems can occur with an optical communication system which transmits signal light over a wide wavelength band. For example, assume signal light of the 1.55 μm band is transmitted over a long distance using an optical transmission path comprising, for example, a single mode optical fiber (SMF) which transmits the wavelength close to 1.3 μm with zero dispersion. In this case, there is a problem that the transmitted waveform becomes distorted if the signal light is transmitted at a high transmission speed. This distortion is due to the wavelength dispersion characteristics of the optical transmission path.

For example, with a general 1.3 μm zero dispersion SMF, there is a wavelength dispersion of approximately 18 ps/nm/km in the vicinity of 1.55 μm. For example, in the case where a signal light of 1.55 μm is transmitted 50 km, then a wavelength dispersion of 900 ps/nm (=18 ps/nm/km×50 km) accumulates. This is generally referred to as primary dispersion, and indicates that a delay difference of 900 ps per wavelength amplitude of 1 nm is produced.

Whether or not this delay difference exerts an influence on the transmission characteristics is related to the time slot of the signal light. That is to say, in the case where the time slot of the signal light is sufficiently longer than the delay difference due to the wavelength dispersion, the influence on the transmission waveform is minimal. However, when the time slot approaches the delay difference, the influence of the wavelength dispersion increases so that the waveform becomes distorted. In general, it is considered that if the transmission speed of the signal light per unit wavelength exceeds approximately 2.5 Gb/s, then compensation for wavelength dispersion is required. For example, in the case where the transmission speed of the signal light is 10 Gb/s, the time slot becomes 100 ps, and the wavelength dispersion of 900 ps/nm for the above mentioned case exerts a considerable influence on the transmission characteristics.

To compensate for the wavelength dispersion characteristics of the optical fiber transmission path, the light signal may be passed through a dispersion compensator having opposite wavelength dispersion characteristics to the transmission path. In the case of compensating for a wavelength dispersion of 900 ps/nm, a dispersion compensator having a wavelength dispersion of −900 ps/nm is used. For example, a dispersion compensating fiber (DCF) is widely used as such a dispersion compensator.

However, in the case where compensation is performed with a wavelength dispersion of 1.55 μm as a reference, as the wavelength band of the signal light is increased, the compensation error increases as the deviation of the wavelength from 1.55 μm increases.

For example, FIG. 2 is a diagram showing wavelength dispersion characteristics for a 1.3 μm zero dispersion SMF. As shown in FIG. 2, the wavelength dispersion characteristic of a 1.3 μm zero dispersion SMF has an incline with respect to wavelength. As a result, for example, a wavelength dispersion with respect to a signal light of 1.53 μm becomes $18 - \Delta_S$ ps/nm/km, and a wavelength dispersion with respect to a signal light of 1.58 μm becomes $18 + \Delta_L$ ps/nm/km. Consequently in the case where 50 km transmission is performed, then even if a dispersion compensator having a compensation amount of the abovementioned −900 ps/nm is used, the $\Delta_S \times 50$ ps/nm component is excessively compensated for with respect to the signal light of 1.53 μm, while the $\Delta_L \times 50$ ps/nm component is insufficiently compensated for with respect to the signal light of 1.58 μm. The wavelength dispersion produced due to this situation where the wavelength dispersion characteristics of the optical fiber transmission path have an incline with respect to the wavelength is generally referred to as secondary dispersion, and when the number of wavelengths of the signal light is large and the wavelength band is wide, it is necessary to perform compensation not only for primary dispersion but also for secondary dispersion.

As mentioned above, a high speed WDM optical communication system with a transmission speed per unit wavelength exceeding 2.5 Gb/s, using a 1.55 µm band or a 1.58 µm band as the band for wavelength division multiplexed signal light is, currently being developed. In realizing such a system, an important consideration is how to compensate for the primary and secondary wavelength dispersion to improve efficiency. Furthermore, it is considered that when wavelength dispersion compensation in the above mentioned wide wavelength band is collectively performed, a signal light of large power is transmitted to the dispersion compensator. Therefore, for example, a nonlinear optical effect such as cross-phase modulation (XPM) or four-wave mixing (FWM) is likely to occur, so that there is the likelihood of degradation of the transmission characteristics.

SUMMARY OF THE INVENTION

Accordingly, it is an object of the present invention to provide an optical amplifier and optical communication system of simple construction which can compensate for wavelength dispersion with respect to WDM signal light of a wide band. Furthermore, it is an object of the present invention to provide a wavelength dispersion compensation method which reduces the probability of the occurrence of nonlinear optical effects when transmitting WDM signal light.

Additional objects and advantages of the invention will be set forth in part in the description which follows, and, in part, will be obvious from the description, or may be learned by practice of the invention.

Objects of the present invention are achieved by providing an apparatus which demultiplexes light into a plurality of wavelength bands according to optical wavelength and respectively amplifies the demultiplexed lights of the respective wavelength bands with a plurality of optical amplifiers. More specifically, the apparatus includes a plurality of optical amplifiers for amplifying the plurality of wavelength bands, a wavelength dispersion compensator for compensating for wavelength dispersion, and an optical multiplexor/demultiplexor. The optical multiplexor/demultiplexor takes out and multiplexes lights of respective wavelength bands from inside the respective optical amplifiers, and then inputs the multiplexed light into the wavelength dispersion compensator, and also demultiplexes the light output from the wavelength dispersion compensator into the respective wavelength bands and returns the demultiplexed lights to the respective optical amplifiers.

Preferably the respective optical amplifiers incorporate a pre-stage optical amplifier section and a post-stage optical amplifier section connected together in series, and the optical multiplexor/demultiplexor takes out light from between the pre-stage optical amplifier section and the post-stage optical amplifier section of each of the respective optical amplifiers. By having such a construction, light signals of an appropriate power are input to the wavelength dispersion compensator. Therefore, the occurrence of nonlinear optical effects and degradation of the optical SN ratio is suppressed.

Moreover, as a specific construction for the respective optical amplifiers, a variable optical attenuator may be provided between the pre-stage optical amplifier section and the optical multiplexor/demultiplexor. Furthermore, with the variable optical attenuator, preferably the light attenuation amount is controlled so that the power of the light output from the post-stage optical amplifier section becomes a fixed level. Preferably, the gains of the pre-stage optical amplifier section and the post-stage optical amplifier section are controlled to be constant.

In addition, preferably, the wavelength dispersion compensator is a dispersion compensating fiber, and the optical multiplexor/demultiplexor has two optical multiplexing/demultiplexing devices respectively connected to both end portions of the dispersion compensating fiber. Lights of adjacent wavelength bands of the lights first taken out from the respective optical amplifiers are respectively input to the dispersion compensating fiber via the different optical multiplexing/demultiplexing devices. Moreover, the respective optical multiplexing/demultiplexing devices may be optical circulators.

With such a construction, the signal lights of adjacent wavelength bands are respectively input from the respective end portions of the dispersion compensating fiber via different optical multiplexing/demultiplexing devices, and propagated in mutually different directions inside the dispersion compensating fiber. As a result, the situation where signal light of large power is concentrated at a specific portion of the dispersion compensating fiber is avoided, and the propagation directions of the lights of adjacent wavelength bands are opposite. Therefore, the probability of the occurrence of nonlinear optical effects in the dispersion compensating fiber is further reduced.

Furthermore, objects of the present invention are achieved by providing an apparatus which demultiplexes light into a plurality of wavelength bands according to optical wavelength and respectively amplifies the demultiplexed lights of the respective wavelength bands with a plurality of optical amplifiers, and then multiplexes the amplified lights. The apparatus further comprises a first wavelength dispersion compensator for compensating for wavelength dispersion with a dispersion amount for a previously set wavelength as a reference, an optical multiplexor/demultiplexor which first takes out and multiplexes lights of respective wavelength bands sent to the respective optical amplifiers and then inputs the multiplexed light into the first wavelength dispersion compensator, and also demultiplexes the light output from the first wavelength dispersion compensator into the respective wavelength bands and returns the demultiplexed lights to the respective optical amplifiers. A second wavelength dispersion compensator separately compensates for the wavelength dispersion which is not completely compensated for by the first wavelength dispersion compensator, for each respective wavelength band.

With such a construction, in the case where wavelength dispersion for the respective wavelength bands cannot be compensated for by a single wavelength dispersion compensator, a first wavelength dispersion compensator for compensating for wavelength dispersion with a dispersion amount for a previously set wavelength as a reference is provided, and a second wavelength dispersion compensator for separately compensating for the wavelength dispersion which is not completely compensated for by the first wavelength dispersion compensator for each respective wavelength band is provided. In this way, an optical amplifier which can perform wavelength dispersion compensation with respect to the respective wavelength bands is realized with a comparatively simple construction.

Objects of the present invention are also achieved by providing an optical communication system for multiply repeating and transmitting wavelength division multiplexed signal light using a plurality of optical amplifier repeaters connected in series via an optical transmission path. The plurality of optical amplifier repeaters are optical amplifiers which divide the light into a plurality of wavelength bands according to optical wavelength, and respectively amplify the demultiplexed lights of the respective wavelength bands with a plurality of optical amplifiers and then multiplex the amplified lights. The plurality of optical amplifier repeaters have first and second constructions.

The optical amplifier repeater of the first construction includes a plurality of optical amplifiers for amplifying a plurality of wavelength bands, respectively. A wavelength dispersion compensator compensates for wavelength dispersion of the wavelength division multiplexed signal light with a dispersion amount for a previously set wavelength as a reference. An optical multiplexor/demultiplexor takes out and multiplexes lights of respective wavelength bands sent to the respective optical amplifiers and then inputs the multiplexed light into the wavelength dispersion compensator, and also demultiplexes the light output from the wavelength dispersion compensator into the respective wavelength bands and returns the demultiplexed lights to the respective optical amplifiers.

The optical amplifier repeater of the second construction includes a plurality of optical amplifiers for amplifying a plurality of wavelength bands, respectively. A first wavelength dispersion compensator compensates for wavelength dispersion of the wavelength division multiplexed signal light with a dispersion amount for a previously set wavelength as a reference. A second wavelength dispersion compensator separately compensates for wavelength dispersion which is not completely compensated for by the first wavelength dispersion compensator, for each respective wavelength band. Preferably, the first construction optical amplifier repeater and the second construction optical amplifier repeater are positioned alternately one after the other.

With such a construction, when the wavelength division multiplexed signal light, which is multiply repeated and transmitted by the plurality of optical amplifier repeaters, passes through the optical amplifier repeater of the first construction, the wavelength dispersion characteristics of the optical transmission path are compensated for by one wavelength dispersion compensator. With this wavelength dispersion compensation, the dispersion amount for the previously set wavelength is made a reference, and sufficient dispersion compensation is not performed for all of the respective wave bands. Therefore, when the wavelength division multiplexed signal light passes through the optical amplifier repeater of the second construction, the wavelength dispersion which has not been completely compensated for is separately compensated for each respective wavelength band. As a result, the wavelength dispersion characteristics of the optical transmission path can be compensated for all of the plurality of optical amplifier repeaters. Consequently, since the optical amplifier repeater of the first construction has a simple construction, it is easy to realize an optical communication system incorporating a wavelength dispersion function.

Furthermore, objects of the present invention are achieved by providing a wavelength dispersion compensation method in which wavelength division multiplexed signal light is demultiplexed into a plurality of wavelength bands according to wavelength. The lights of adjacent wavelength bands of the demultiplexed lights are respectively input from different end portions of the dispersion compensating fiber, and the lights of respective wavelength bands respectively output from the respective end portions of the dispersion compensating fiber are multiplexed.

With such a construction, the lights of adjacent wavelength bands are respectively input from the different end portions of the dispersion compensating fiber and propagated in mutually different directions inside the dispersion compensating fiber. As a result, the situation where signal light of large power is concentrated at a specific portion of the dispersion compensating fiber is avoided, and the propagation directions of the lights of adjacent wavelength bands are opposite. Therefore the probability of the occurrence of the nonlinear optical effect in the dispersion compensating fiber is further reduced.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4 is a diagram showing an optical amplifier, according to an additional embodiment of the present invention.

DESCRIPTION OF THE PREFERRED EMBODIMENTS

Figure 1:
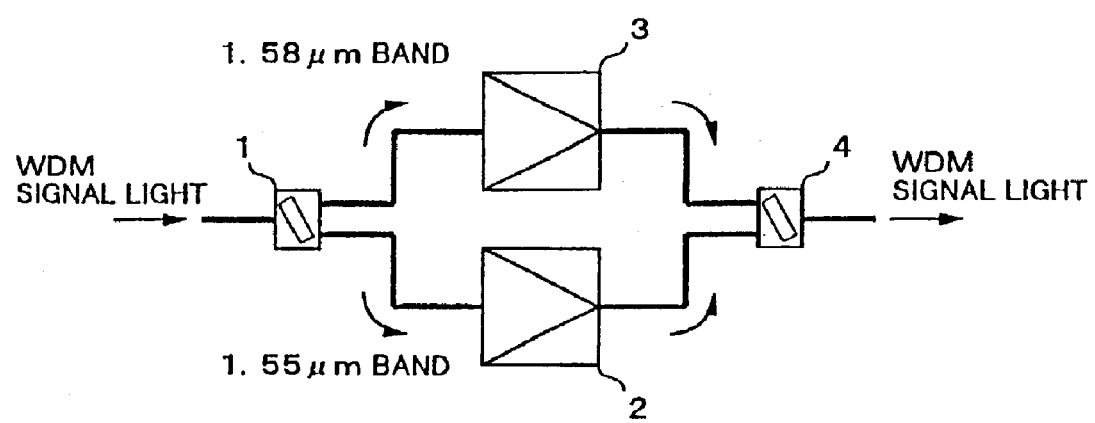
FIG. 1 (prior art) is a diagram showing a conventional optical amplifier for amplifying WDM signal light of a 1.55 $\mu$m band and a 1.58 $\mu$m band.

Reference will now be made in detail to the present preferred embodiments of the present invention, examples of which are illustrated in the accompanying drawings, wherein like reference numerals refer to like elements throughout.

Figure 3:
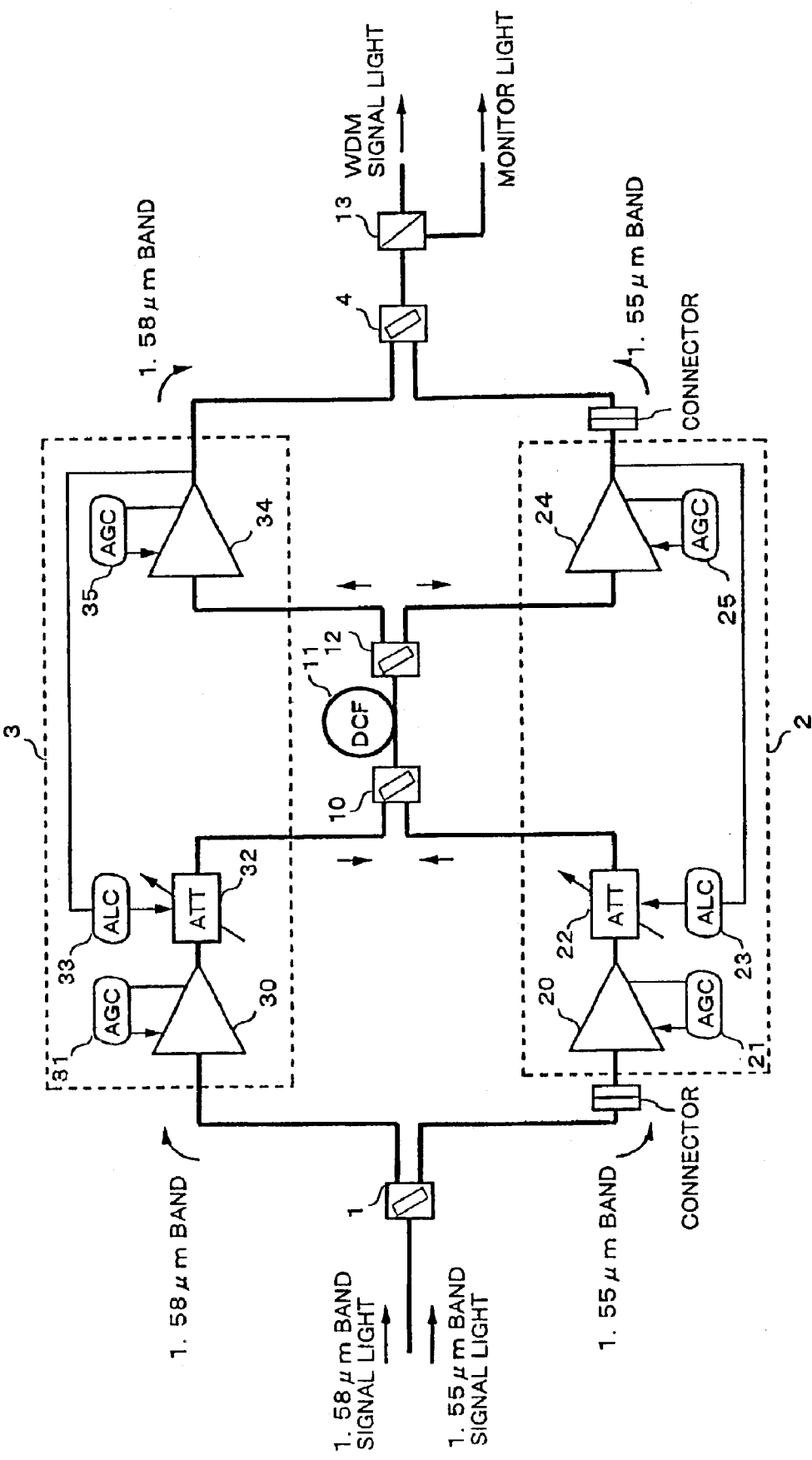
FIG. 3 is a diagram showing an optical amplifier, according to an embodiment of the present invention.

FIG. 3 is a diagram showing an optical amplifier, according to an embodiment of the present invention. Referring now to FIG. 3, a WDM signal light from, typically, a SMF (not illustrated) includes signal light in a 1.55 $\mu$m band and a 1.58 $\mu$m band. A WDM coupler 1 demultiplexes the WDM signal light according to the wavelength bands, and the signal light in the 1.55 $\mu$m band is sent to a 1.55 $\mu$m band optical fiber amplifier section 2, and the signal light in the 1.58 μm band is sent to a 1.58 μm band optical fiber amplifier section 3. As an example, the signal light in the 1.55 μm band might include signal lights of thirty two waves multiplexed in a wavelength band from 1535 nm to 1565 nm. As an example, the signal light in the 1.58 μm band might include thirty two waves multiplexed in a wavelength band from 1575 nm to 1605 nm. However, the WDM signal light of the present invention is not limited to these example wavelength arrangements, these wavelengths, or these wavelength bands, and many variations are possible.

The signal light input to 1.55 μm band optical fiber amplifier section 2 is amplified to a predetermined level in an optical fiber amplifier 20. With optical fiber amplifier 20, the gain is controlled to be constant by an automatic gain control (AGC) circuit 21. Therefore, the wavelength characteristics of the gain are constant for a wide input range. Then, the signal light output from optical fiber amplifier 20 is sent to a variable optical attenuator (ATT) 22 and attenuated in accordance with an optical attenuation value controlled by an automatic level control (ALC) circuit 23. The signal light which has passed through variable optical attenuator 22 is then sent to a WDM coupler 10.

The signal light input to 1.58 μm band optical fiber amplifier section 3 is amplified to a predetermined level in an optical fiber amplifier 30. With optical fiber amplifier 30, the gain is controlled to be constant by an automatic gain control (AGC) circuit 31. Therefore, the wavelength characteristics of the gain are constant for a wide input range. Then, the signal light output from optical fiber amplifier 30 is sent to a variable optical attenuator (ATT) 32 and attenuated in accordance with an optical attenuation value controlled by an automatic level control (ALC) circuit 33. The signal light which has passed through variable optical attenuator 32 is then sent to WDM coupler 10.

In WDM coupler 10, the signal lights of the respective wavelength bands sent from respective variable optical attenuators 22 and 32 are multiplexed and then sent to a DCF 11. By passing the multiplexed signal light through DCF 11, wavelength dispersion in the 1.55 μm band and the 1.58 μm band is compensated collectively. The signal light receives a loss from DCF 11 so that the power at the output of DCF 11 is reduced by approximately 10 dB compared to the power at the input of DCF 11.

Therefore, the signal light output from DCF 11 is again demultiplexed into the 1.55 μm band and the 1.58 μm band by a WDM coupler 12. The signal light in the 1.55 μm band is sent to post-stage optical fiber amplifier 24. Similarly, the signal light in the 1.58 μm band is sent to post-stage optical fiber amplifier 34.

With optical fiber amplifier 24, the gain is controlled to be constant by an automatic gain control (AGC) circuit 25. Similarly, with optical fiber amplifier 34, the gain is controlled to be constant by an automatic gain control (AGC) circuit 35. Therefore, with the respective optical fiber amplifiers 24 and 34, the signal lights of the corresponding wavelength bands are amplified at a constant gain to a predetermined level.

A part of the amplified signal from optical fiber amplifier 24 is returned to ALC circuit 23 to control variable optical attenuator 22 to maintain the output light level of optical fiber amplifier section 2 constant. Similarly, a part of the amplified signal from optical fiber amplifier 34 is returned to ALC circuit 33 to control variable optical attenuator 32 to maintain the output light level of optical fiber amplifier section 3 constant.

Then, the signal lights output from optical fiber amplifier sections 2 and 3, being controlled to a constant level, are sent to a WDM coupler 4. With WDM coupler 4, the signal lights of the 1.55 μm band and the 1.58 μm band for which amplification and wavelength dispersion compensation has been effected, are multiplexed and sent to an optical coupler 13. In optical coupler 13, the WDM signal light from WDM coupler 4 is output as the output light for the optical amplifier, and a part thereof is branched for monitor light.

With this monitor light, for example, the spectrum of the WDM signal light output from the optical amplifier can be monitored and used for adjustment and the like of the operating conditions of optical fiber amplifier sections 2 and 3 so that the signal light power of the respective wavelength bands becomes approximately equal. The monitor light is particularly useful to enable verification of the connection conditions, or adjustment of the operating conditions, for example, in the case where the optical amplifier is to be furnished with expansion capability. For example, via the monitor light, the amplification provided by 1.58 μm band optical fiber amplifier section 3 can be increased with an increase in the number of multiplexed wavelengths. Alternately, if the respective wavelength light from the monitor light is extracted, and the respective signal waveforms monitored, this can also be used to verify whether or not wavelength dispersion compensation is being effectively performed.

Preferably, DCF 11 is a secondary dispersion compensation type which is able to collectively compensate for the wavelength dispersion characteristics with respect to a 1.55 μm band and a 1.58 μm band of a 1.3 μm zero dispersion SMF.

In FIG. 3, 1.55 μm band optical fiber amplifier section 2 and 1.58 μm band optical fiber amplifier section 3 are each two-stage amplifiers. Before being sent to the post-stage optical amplifier sections, the respective wavelength band signal lights are taken out, multiplexed in WDM coupler 10, and then sent to DCF 11. The signal lights which have passed through DCF 11 are again demultiplexed into a 1.55 μm band and a 1.58 μm band in WDM coupler 12, and then returned to the post-stage optical amplifier sections of the respective optical fiber amplifier sections 2 and 3.

In 1.55 μm band optical fiber amplifier section 2, optical fiber amplifier 20 serves as a pre-stage optical amplifier section and optical fiber amplifier 24 serves as a post-stage optical amplifier section. As indicated above, respective optical fiber amplifiers 20 and 24 are provided with AGC circuits 21 and 25, respectively, for controlling the amplification gain to be constant. Moreover, as indicated above, variable optical attenuator 22 is provided ALC circuit 23 for controlling the variable attenuation amount so that the power level of the signal light output from post-stage optical fiber amplifier 24 is constant. Similarly, as indicated above, variable optical attenuator 32 is provided ALC circuit 33 for controlling the variable attenuation amount so that the power level of the signal light output from post-stage optical fiber amplifier 34 is constant.

Optical amplifiers 20 and 24 are optical amplifiers where, for example, a signal light of a 1.55 μm band is sent to an erbium doped fiber (EDF) (not illustrated) which is in an excited state due to excitation light of a 0.98 μm band or a 1.48 μm band, to thereby amplify respective wavelength light of the 1.55 μm band at approximately equal gains. However, optical amplifiers 20 and 24 are not intended to be limited to this construction, or to these specific excitation light wavelengths, or to using an EDF. Instead, many different types of optical amplifiers can be used.

As indicated above, 1.58 μm band optical fiber amplifier section 3 comprises optical fiber amplifiers 30 and 34 provided with AGC circuits 31 and 35, respectively, and variable optical attenuator (ATT) 32 provided with ALC circuit 33. Known 1.58 μm band optical fiber amplifiers can be used, for example, as optical fiber amplifiers 30 and 34. In such optical amplifiers, an EDF can be employed as an amplification medium. In order to produce an optical amplification effect in the 1.58 μm band, for example, the EDF length is made longer than that for an 1.55 μm band optical fiber amplifier.

To explain briefly the operating theory for an 1.58 μm band optical fiber amplifier, the erbium atom inside the EDF is excited by excitation light of a 1.48 μm band or a 0.98 μm band, and a 1.55 μm band spontaneous emission light (ASE) is produced in the former half portion of the EDF. This 1.55 μm band ASE is reabsorbed in the latter half portion of the EDF to thereby produce induced emission in the 1.58 μm band. Since the cross-sectional area of the induced emission in the 1.58 μm band is smaller than that in the 1.55 μm band, and it is necessary to produce a sufficiently large 1.55 μm band ASE. Therefore, for example, the fiber length of the EDF is increased to thereby realize optical amplification in the 1.58 μm band. However, optical fiber amplifiers 30 and 34 are not intended to be limited to this construction. Instead, many different types of optical amplifiers can be used.

WDM couplers 10 and 12 are, for example, couplers where, as with WDM couplers 1 and 4, when lights in the 1.55 μm band and the 1.58 μm band are input to prescribed ports, these lights are multiplexed and output from a single port. On the other hand, when the multiplexed light of the 1.55 μm band and the 1.58 μm band is input, this light is demultiplexed into lights of the 1.55 μband and the 1.58 μm band and output from the prescribed ports. Such couplers are known, and the present invention is not limited to any specific coupler.

Figure 2:
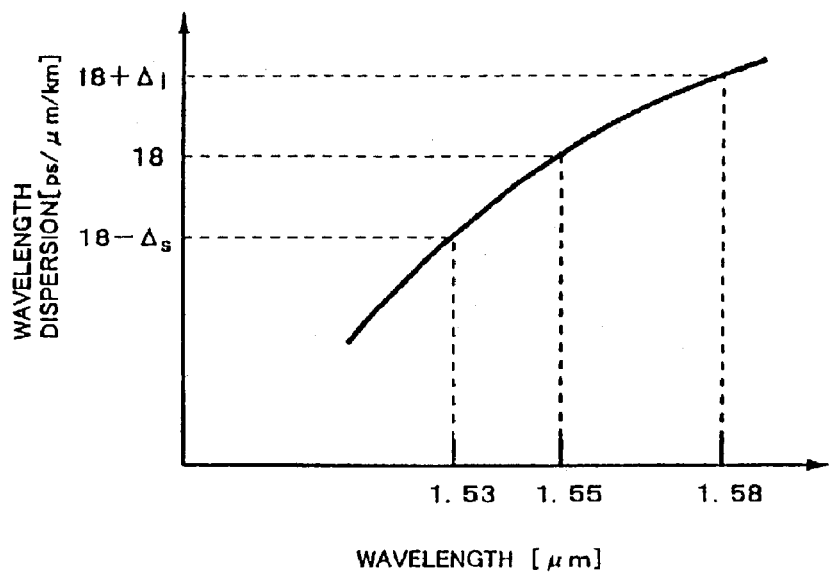
FIG. 2 (prior art) is a diagram showing wavelength dispersion characteristics for a 1.3 $\mu$m zero dispersion SMF.

In the optical amplifier of FIG. 3, DCF 11 is preferably a dispersion compensating fiber of the secondary dispersion compensation type with a wide band including, for example, the 1.55 μm band and the 1.58 μm band. More specifically, a dispersion compensating fiber which has a wavelength dispersion characteristic with a negative sign and a negative incline in contrast with the wavelength dispersion characteristics of the 1.3 μm zero dispersion SMF shown in FIG. 2 is used. With DCF 11, the losses are greater than with the SMF. Here, for example, with a length of approximately 10 km of DCF, there is a loss of approximately 10 dB. However, the present invention is not limited to any specific type of DCF, or any specific wavelength bands.

In FIG. 3, optical coupler 13 is provided after WDM coupler 4 on the output side. Optical coupler 13 is for taking out, at a branch ratio of, for example, 10:1, a portion of the WDM signal light which has been multiplexed in WDM coupler 4 to become the output light of the optical amplifier, in order to obtain monitor light. Of course, optical coupler 13 is not limited to this branching ratio.

As illustrated in FIG. 3, the input and output of 1.55 μm band optical amplifier 2 preferably serve as a connector interface. If this is done, then by simply interchanging the input and output of 1.55 μm band optical amplifier 2, a bidirectional optical amplifier can be realized. (See, for example, the bi-directional optical amplifier in FIG. 4, discussed later.) This is possible because, with this construction, the ALC is realized by a variable optical attenuator for both the 1.55 μm band and the 1.58 μm band. That is, even if the span losses on the input side and the output side of a point setting the optical amplifier are different, since the variable optical attenuator absorbs the fluctuations in the span losses, selection in a single direction or two directions becomes possible.

With the optical amplifier in FIG. 3, WDM signal light can be transmitted at high speed. This WDM signal light is amplified by demultiplexing into two wavelength bands, then by incorporating a DCF which can compensate for wavelength dispersion for the respective wavelength bands collectively, inside the optical amplifier. Therefore, an optical amplifier provided with a wavelength dispersion compensation function can be realized with a simple construction. With this, compared to an example where respective DCFs are provided for each of the 1.55 μm band and the 1.58 μm band, the number of high cost DCFs can be reduced. Hence, it is possible to reduce the price of an optical amplifier provided with a wavelength dispersion compensation function.

With the optical amplifier in FIG. 3, the construction is for a case where the respective signal lights prior to input to the respective optical fiber amplifiers 24 and 34 for the respective wavelengths are taken out and sent to DCF 11. However the present invention is not limited to this. For example, a construction is also possible where the signal light at optional positions of the respective optical fiber amplifiers 2 and 3, for example, the signal light output from the respective optical fiber amplifiers 24 and 34, is taken out and sent to DCF 11. However, if consideration is given to the influence of nonlinear optical effects, and to noise characteristics etc., ideally the signal light should be taken out from between the pre-stage optical amplifier section and the post-stage optical amplifier section.

That is, in the case where the respective signal lights amplified by the post-stage optical amplifier section are taken out, then signal light of an extremely large power is input to a DCF with a small core diameter. Hence, the probability of the occurrence of nonlinear optical effects is high. On the other hand, in the case where respective signal lights prior to being amplified by the pre-stage optical amplifier section are taken out, signal light of a comparatively low power is input to the high loss DCF. Therefore, the optical SN ratio is degraded. Consequently, sending signal light to the DCF, after amplifying by the pre-stage optical amplifier section and prior to being amplified by the post-stage optical amplifier section, is preferable.

FIG. 4 is a diagram showing an optical amplifier, according to an embodiment of the present invention. With the optical amplifier in FIG. 3, the respective signal lights of the 1.55 μm band and the 1.58 μm band were transmitted in the same direction. By contrast, with the optical amplifier in FIG. 4, the signal lights of the respective wavelength bands are transmitted in mutually opposite directions. More specifically, the transmission direction for the 1.55 μm band signal light is in the opposite direction (from the right to left) in FIG. 4, as compared to that in FIG. 3. Moreover, the input/output positions of 1.55 μm band optical fiber amplifier section 2 are reversed in FIG. 4, as compared to that in FIG. 3. The remaining components in FIG. 4 are the same as that in FIG. 3.

Referring now to FIG. 4, the signal light of the 1.55 μm band is sent to 1.55 μm band optical fiber amplifier section 2 via WDM coupler 4. Furthermore, the signal light of the 1.58 μm band is sent to 1.58 μm band optical fiber amplifier section 3 via WDM coupler 1. The signal lights of the respective wavelength bands are respectively amplified by optical fiber amplifiers 20 and 30, and respectively attenuated by variable optical attenuators 22 and 32. The 1.55 μm band signal light output from variable optical attenuator 22 is input from the port on the right side (in FIG. 4) of DCF 11 via WDM coupler 12. On the other hand, the 1.58 μm band signal light output from variable optical attenuator 32 is input from the port on the left side (in FIG. 4) of DCF 11 via WDM coupler 10. The signal lights of the respective wavelength bands input to DCF 11 are propagated in mutually opposite directions inside DCF 11 to thereby be subjected to wavelength dispersion compensation.

The signal lights of the respective wavelength bands which have passed through DCF 11 are sent to the respective optical fiber amplifiers 24 and 34 via WDM couplers 10 and 12, and amplified to a predetermined level. Then, the 1.55 μm band signal light output from optical fiber amplifier 24 is output to an external SMF via WDM coupler 1, while the 1.58 μm band signal light output from optical fiber amplifier 34 is output to the external SMF via WDM coupler 4.

The optical amplifier in FIG. 4 differs from the optical amplifier in FIG. 3 in that the probability of occurrence of nonlinear optical effects inside DCF 11 is kept low. For example, since the loss in DCF 11 is large at around 10 dB, the power of the respective signal lights propagated inside DCF 11 changes.

Figure 5A:
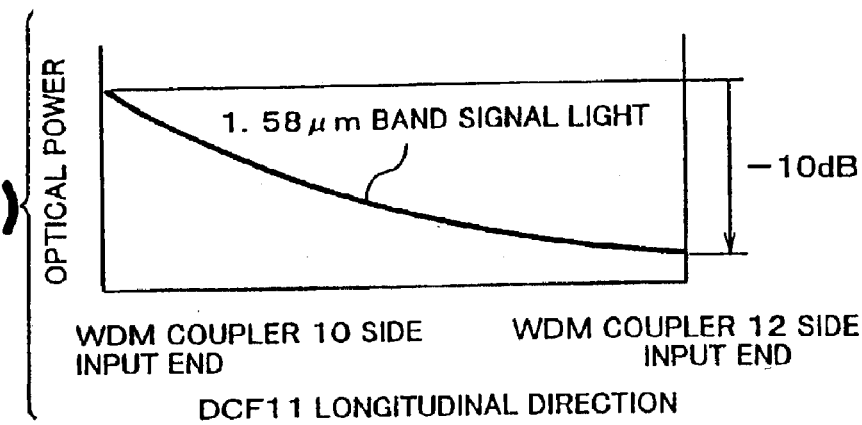
FIGS. 5(A) and 5(B) are diagrams showing changes in optical power inside a dispersion compensating fiber (DCF) of signal light in the 1.58 $\mu$m band and the 1.55 $\mu$m band, respectively, in the optical amplifier of FIG. 4, according to an embodiment of the present invention.
Figure 5B:
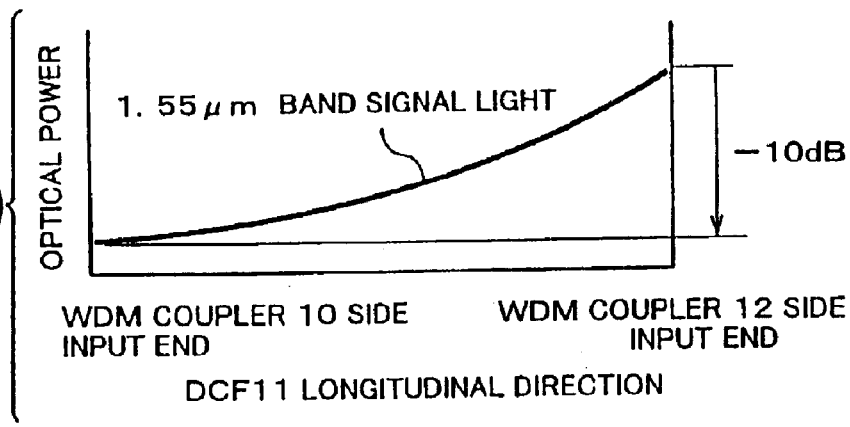

For example, FIGS. 5(A) and 5(B) are diagrams showing changes in optical power inside DCF 11 of signal light in the 1.58 μm band and the 1.55 μm band, respectively, in the optical amplifier of FIG. 4. As a consequence of the changes in optical power inside DCF 11 as illustrated in FIGS. 5(A) and 5(B), even though the powers of the respective input signal lights increase, the situation where a large optical power is concentrated at a specific part inside DCF 11 does not arise. Furthermore, the propagation directions for the respective signal lights inside DCF 11 also become opposite directions. Due to the multiplier effect of this, it is difficult for the nonlinear optical effects to occur.

In the above manner, with the optical amplifier in FIG. 4, even in the case where signal lights of two wavelength bands are transmitted in two directions, an optical amplifier with a wavelength dispersion compensation function can be realized with a simple construction. In addition, since the signal lights of the respective wavelength bands are input from different ports of the DCF, then the probability of occurrence of nonlinear optical effects in the DCF can be reduced, so that more stable transmission characteristics can be obtained.

In FIG. 4, the signal lights of respective wavelength bands are input to DCF 11 via WDM couplers 10 and 12. However the present invention is not limited to this.

Figure 6:
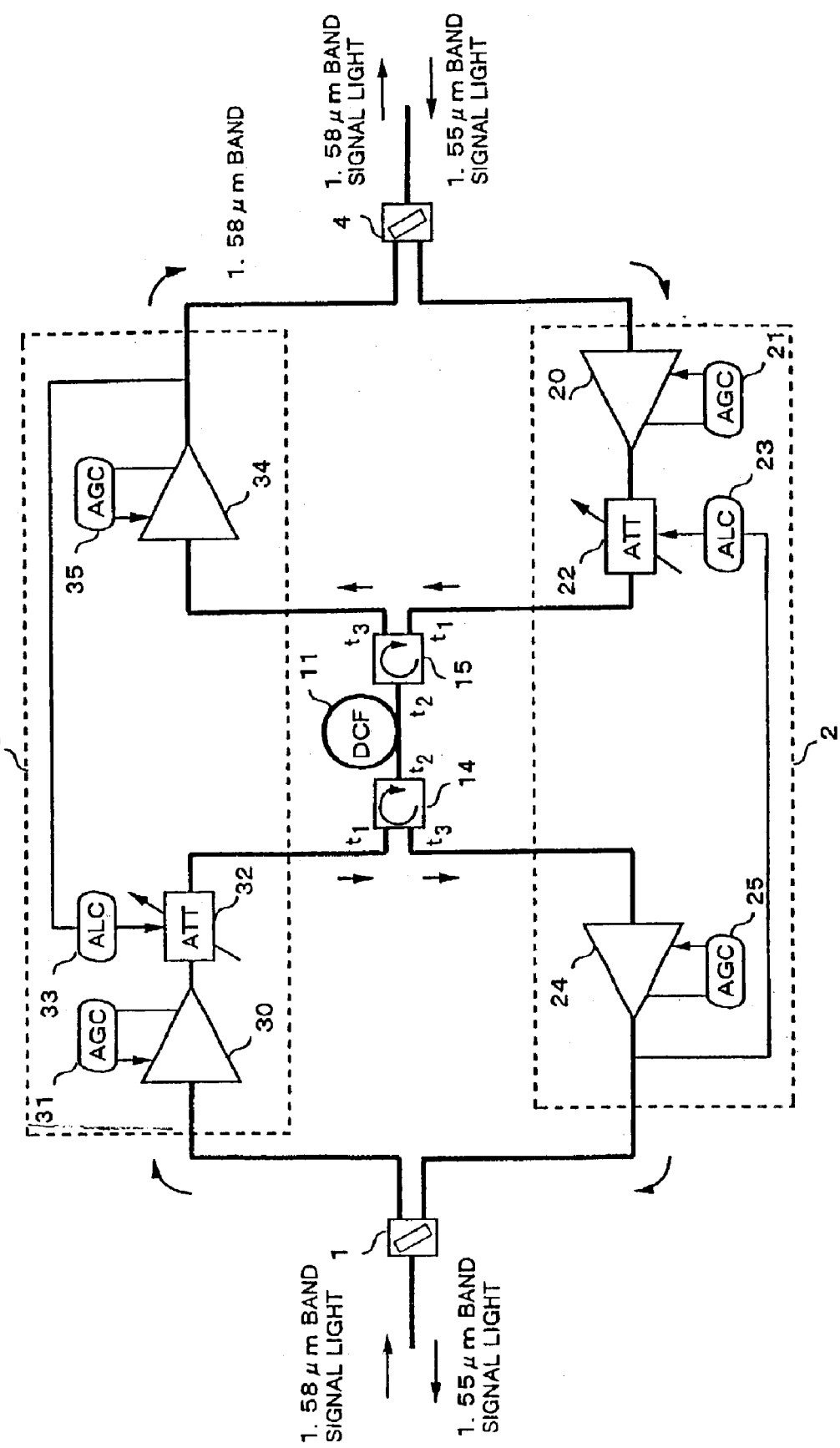
FIG. 6 is a diagram showing an optical amplifier, according to a further embodiment of the present invention.

For example, FIG. 6 is a diagram illustrating an optical amplifier, according to an additional embodiment of the present invention. In FIG. 6, optical circulators 14 and 15 are used instead of WDM couplers 10 and 12. Optical circulators 14 and 15 are, for example, known optical circuit elements having, for example, three terminals $t_1$, $t_2$ and $t_3$, wherein light which proceeds between the respective terminals in the sequential direction t1→t2, t2→t3, t3→t1, has a low loss while light which proceeds in the opposite direction has a high loss.

Figure 7:
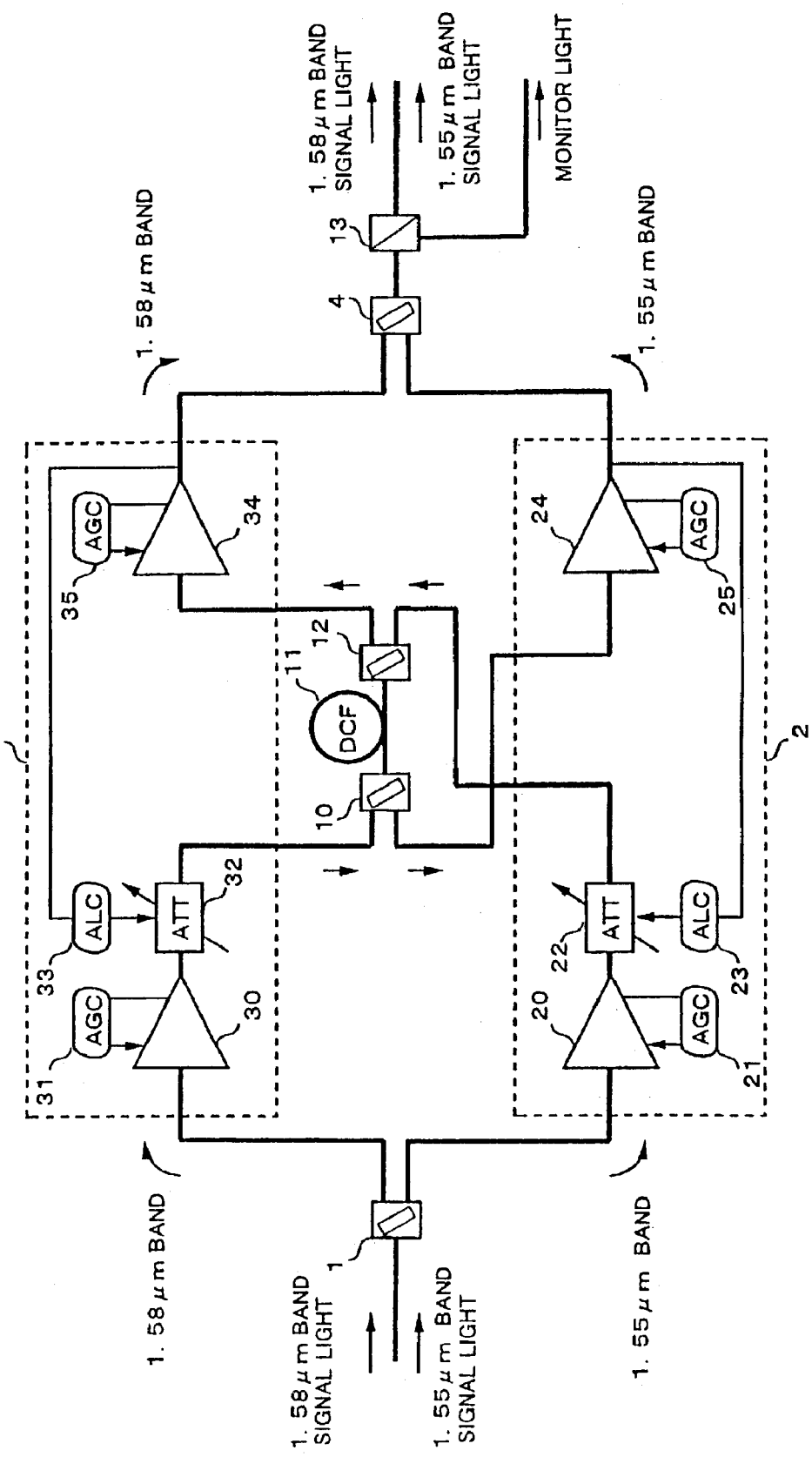
FIG. 7 is a diagram showing an optical amplifier, according to a still further embodiment of the present invention.

FIG. 7 is a diagram showing an optical amplifier, according to an additional embodiment of the present invention. The optical amplifier in FIG. 7 is an improved example of the optical amplifier in FIG. 3, in that, for example, in the case where the transmission directions for two wavelength bands are in the same direction, the occurrence of nonlinear optical effects in the DCF 11 is reduced.

Referring now to FIG. 7, the respective connections are changed in the optical amplifier of FIG. 3, so that the signal light output from variable optical attenuator 22 of 1.55 μm band optical fiber amplifier section 2 is input to DCF 11 via WDM coupler 12, and the 1.55 μm band signal light which is passed through DCF 11 is sent to optical fiber amplifier 24 via WDM coupler 10.

With the optical amplifier of FIG. 7, the signal lights output from variable optical attenuators 22 and 32 of the respective wavelength bands are respectively input to different ports of DCF 11 and propagated inside DCF 11 in mutually opposite directions. As a result, even though the powers of the lights respectively input to DCF 11 increase, the situation where a large optical power is concentrated in the vicinity of one port does not arise, and the propagation directions of the respective signal lights are opposite. Hence it is difficult for the nonlinear optical effects to occur.

In the above manner, with the optical amplifier of FIG. 7, even though the transmission directions for the respective wavelength bands are in the same direction, by merely making the propagation directions inside DCF 11 opposite, the probability of the occurrence of the nonlinear optical effects can be reduced. Hence, it is possible to obtain more stable transmission characteristics.

With the optical amplifier in FIG. 7, the signal lights of the respective wavelength bands are input to DCF 11 via WDM couplers 10 and 12. However, as described above, instead of WDM couplers 10 and 12, optical circulators may be used.

Figure 8:
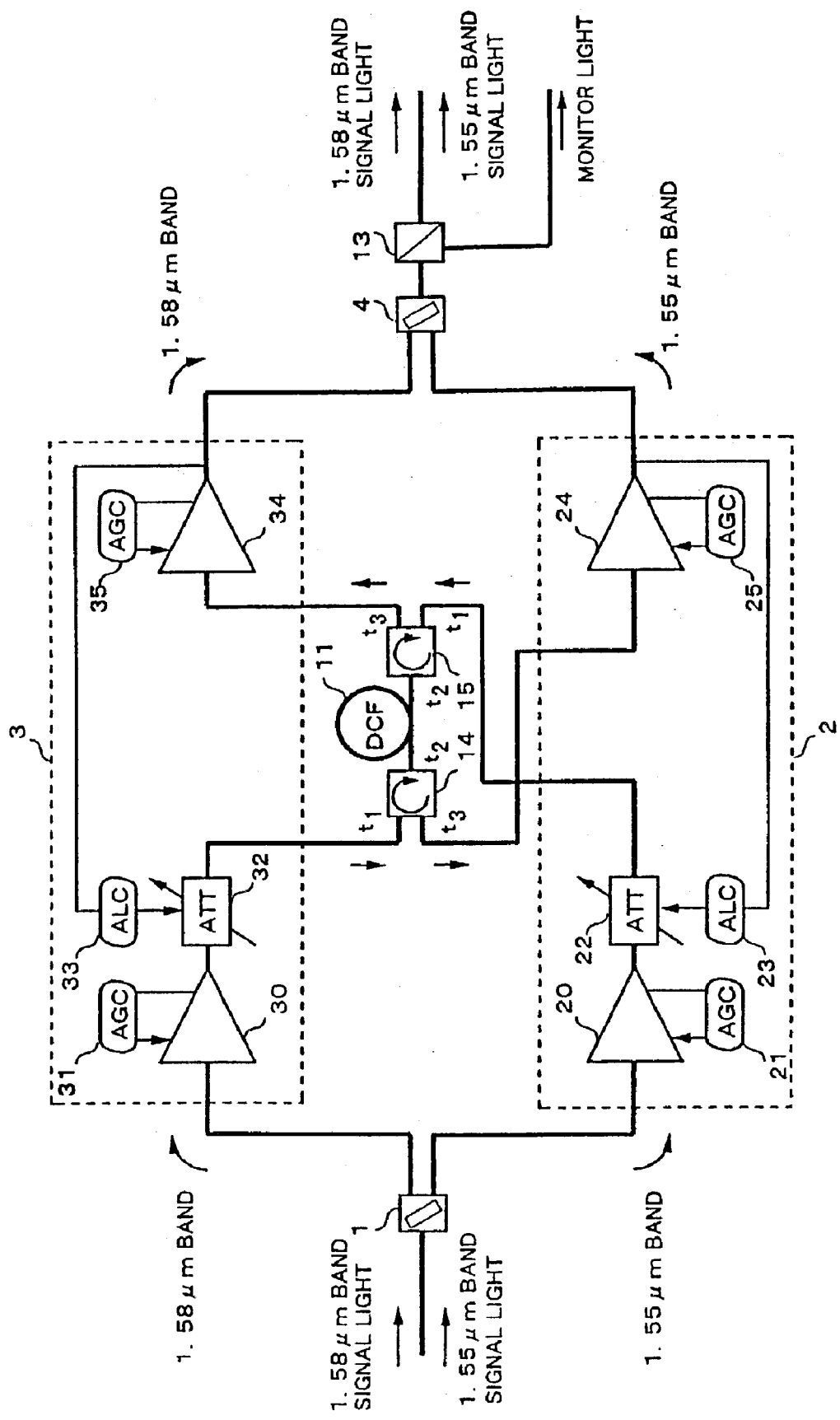
FIG. 8 is a diagram showing an optical amplifier, according to an embodiment of the present invention.

For example, FIG. 8 is a diagram illustrating an optical amplifier according to an embodiment of the present invention. The optical amplifier in FIG. 8 is similar to that in FIG. 7, but uses circulators 14 and 15 instead of WDM couplers 10 and 12.

With the optical amplifiers in FIGS. 3–8, a single DCF is able to collectively compensate for the wavelength dispersion for the respective wavelength bands. However, in some cases, a single DCF may not be able to appropriately compensate for the primary and secondary wavelength dispersion in a wide band. For example, different wavelengths typically require different amounts of dispersion compensation, so that a single DCF may not be able to appropriately compensate for dispersion over a wide band. For example, as indicated by FIG. 2, more dispersion compensation is needed with the 1.58 μm band as compared to that required for the 1.55 μm band.

Figure 9:
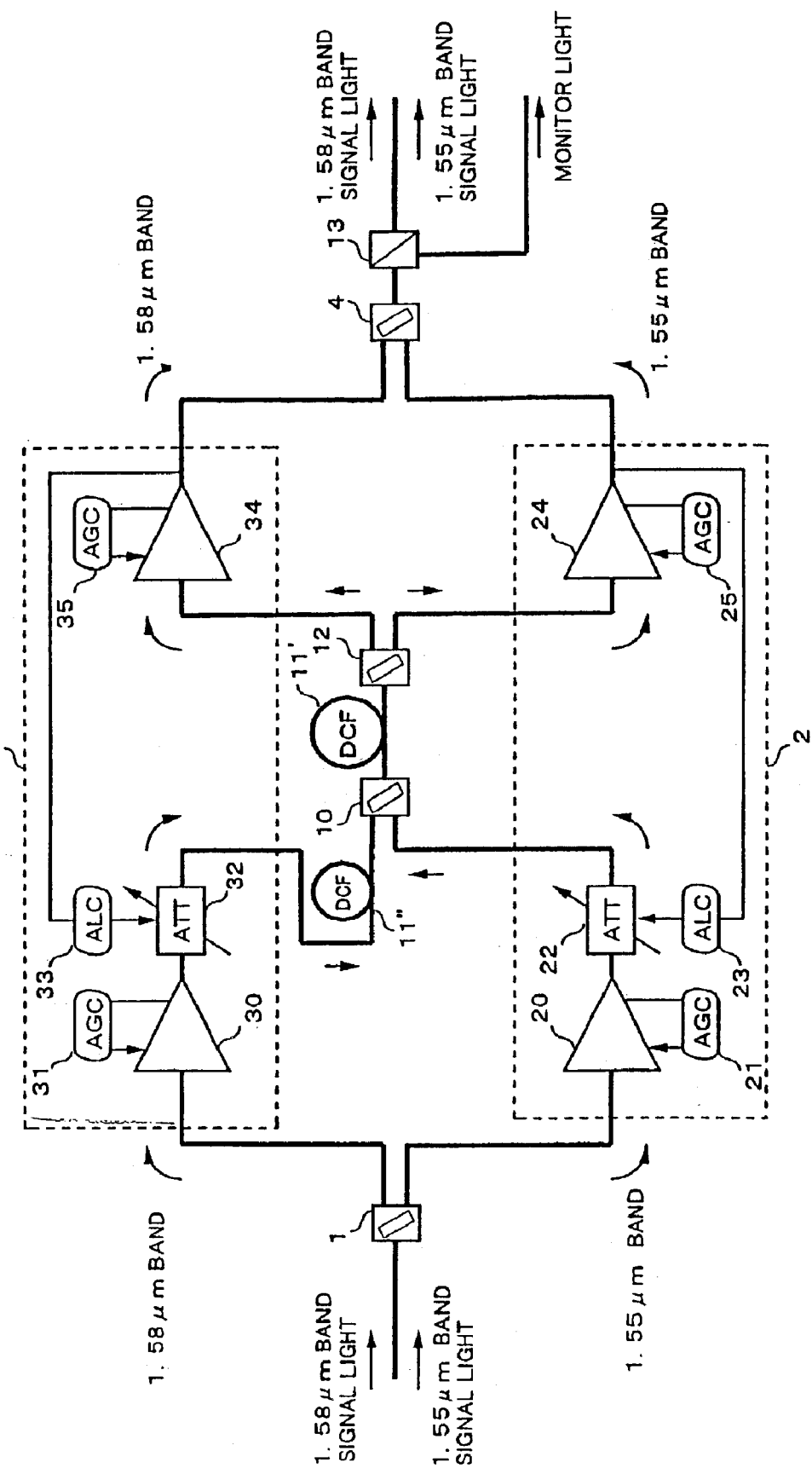
FIG. 9 is a diagram showing an optical amplifier, according to an additional embodiment of the present invention.

To address this situation, FIG. 9 is a diagram showing an optical amplifier, according to an additional embodiment of the present invention. More specifically, FIG. 9 shows a technique for providing an extra DCF for a respective band requiring additional dispersion compensation, such as the 1.58 μm band.

With the optical amplifier in FIG. 9, instead of DCF 11 (such as that in FIG. 3), a DCF 11' is used. Moreover, assuming that DCF 11' does not provide sufficient dispersion compensation for the 1.58 μm band, an additional DCF 11" is provided between variable optical attenuator 32 and WDM coupler 10. Construction other than this is the same that in FIG. 3.

With DCF 11', the compensation amount is set, for example, with the dispersion amount for a previously set wavelength in the 1.55 μm band as a reference, and primary and secondary wavelength dispersion compensation for the 1.55 μm band is possible. However, wavelength dispersion compensation for the 1.58 μm band cannot be sufficiently performed so that a not yet compensated portion is produced. With DCF 11", the compensation amount is adjusted so as to correspond to the not yet compensated portion of DCF 11'. Consequently, by passing the signal light of the 1.58 μm band through DCF 11" and DCF 11', the primary and secondary dispersion is compensated for.

In this way, in the case where dispersion compensation for all of the wavelength bands cannot be collectively performed with one DCF, by providing the two DCFs, DCF 11" and DCF 11', dispersion compensation for all wavelength bands can be performed with a single optical amplifier of a comparatively simple construction.

With the optical amplifier of FIG. 9, DCF 11" is provided between variable optical attenuator 32 and WDM coupler 10. However the location of DCF 11" is not limited to this, and may be provided, for example, between WDM coupler 12 and optical fiber amplifier 34.

With the optical amplifier in FIG. 9, wavelength dispersion compensation is possible with respect to all bands, inside one optical amplifier.

While FIG. 9 shows an optical amplifier for amplifying two wavelength bands, the present invention is clearly applicable to optical amplifiers for amplifying more than two wavelength bands. In this case, for example, different DCFs, such as DCF 11", can be provide for each wavelength band requiring additional dispersion compensation.

Figure 10:
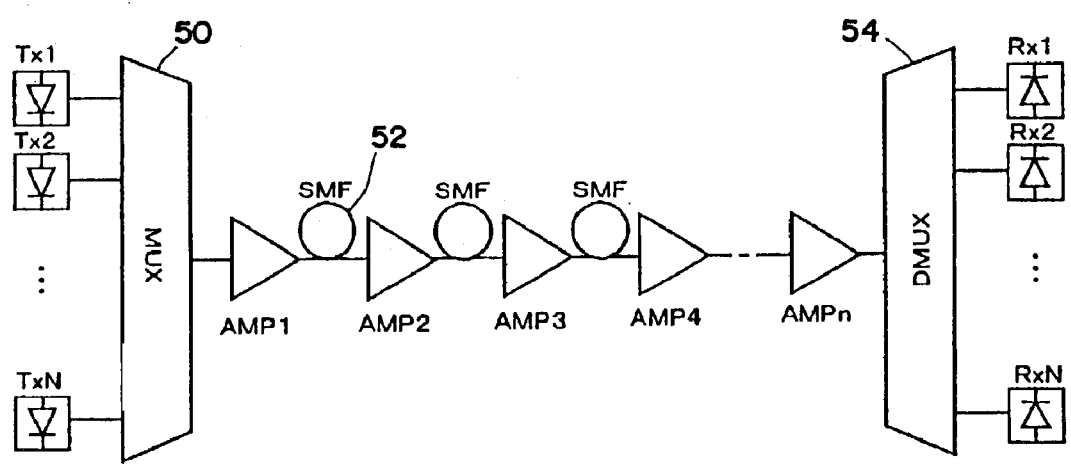
FIG. 10 is a diagram showing an optical communication system, according to an embodiment of the present invention.

FIG. 10 is a diagram showing an optical communication system, according to an embodiment of the present invention. With the optical communication system of FIG. 10, wavelength dispersion compensation for all wavelength bands is made possible by a plurality optical amplifier repeaters connected in series via SMFs.

Referring now to FIG. 10, signal lights transmitted from optical transmitters Tx1 to TxN for generating signal light of N waves with different wavelengths located, for example, in the 1.55 μm band and the 1.58 μm band, are multiplexed in a multiplexer (MUX) 50 and output to a single SMF 52. After being transmitted while being successively amplified by n optical amplifier repeaters AMP1 to AMPn, the wavelength division multiplexed signal light is demultiplexed for each respective wavelength by a demultiplexer (DMUX) 54 and received by corresponding light receivers Rx1 to RxN.

Of optical amplifier repeaters AMP1 to AMPn, for example, the odd number optical amplifiers AMP1, AMP3 . . . , are constructed as illustrated, for example, in FIG. 3, or in various of the other embodiments of the present invention discussed above. However, it is assumed that the respective DCFs 11 used in these optical amplifier repeaters AMP1, AMP3, . . . , do not have a sufficiently wide band which can collectively compensate for the wavelength dispersion for the wavelength bands, and hence insufficient compensation or excessive compensation occurs.

On the other hand, the even number optical amplifier repeaters AMP2, AMP4, . . . , serving as compensation optical amplifier repeaters, have a different construction.

Figure 11:
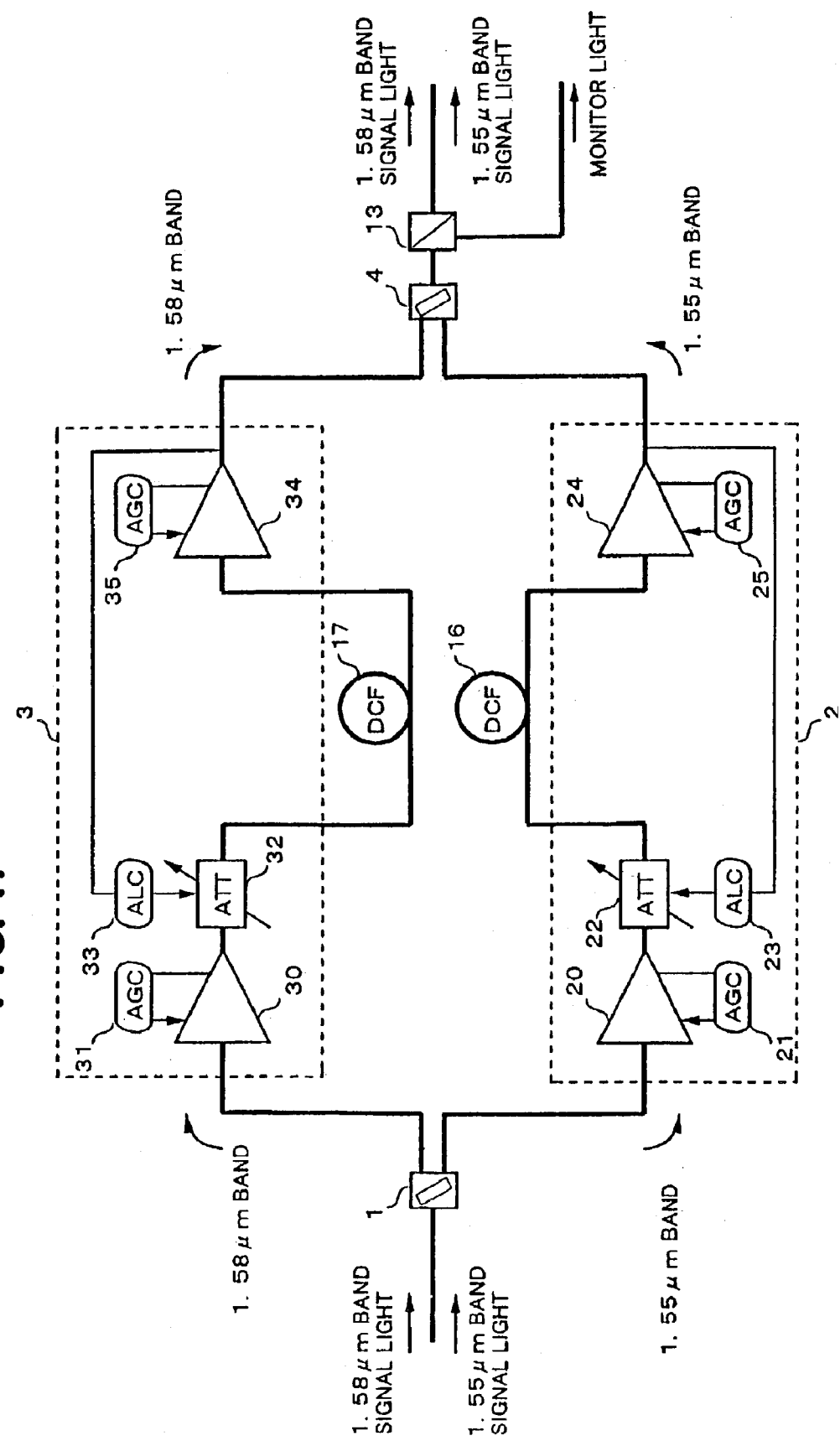
FIG. 11 is a diagram showing an even number optical amplifier repeater, according to an embodiment of the present invention, as used in the optical communication system of FIG. 10.

More specifically, FIG. 11 is a diagram showing an even number optical amplifier repeater, according to an embodiment of the present invention, as used in the optical communication system of FIG. 10. Referring now to FIG. 11, with the even number optical amplifier repeaters AMP2, AMP4, . . . , the construction is such that, with the 1.55 μm band, the signal lights output from variable optical attenuator 22 travel through DCF 16 and then to optical fiber amplifier 24. Similarly, with the 1.58 μm band, the signal lights output from variable optical attenuator 32 travel through DCF 17 and then to optical fiber amplifier 34. Thus, DCFs 16 and 17 are provided for separately compensating for the wavelength dispersion in the upstream SMF and the wavelength dispersion which cannot be compensated for by the upstream optical amplifier repeaters, for each respective band.

Figure 12:
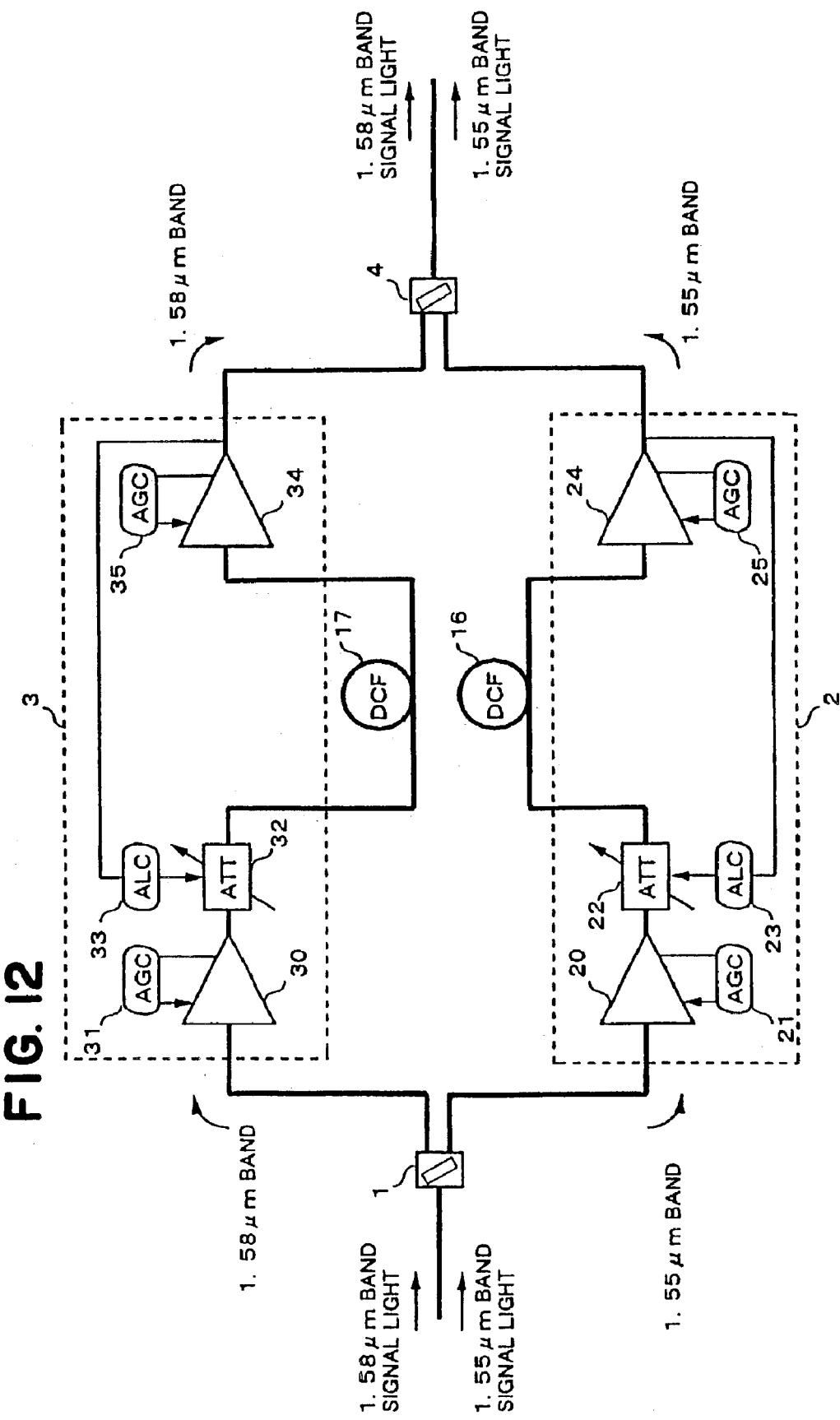
FIG. 12 is a diagram showing an even number optical amplifier repeater, according to an additional embodiment of the present invention, as used in the optical communication system of FIG. 10.

FIG. 12 is a diagram showing an even number optical amplifier repeater, according to an additional embodiment of the present invention, as used in the optical communication system of FIG. 10. The optical amplifier in FIG. 12 is different than that in FIG. 11 in that optical coupler 13 is omitted.

To give a specific example for the respective DCFs, with the DCF used in the odd number optical amplifier repeaters AMP1, AMP3, . . . , if this is one where the dispersion amount for the wavelength of approximately 1.57 μm being approximately the center for the used wavelength band is made a reference, then excessive compensation is produced for the 1.55 μm band and insufficient compensation is produced for the 1.58 μm band. In this case, for the 1.55 μm band DCF 16 used in the even number optical amplifier repeaters AMP2, AMP4, . . . , one having a positive wavelength dispersion corresponding to the excessive compensation portion is used, and for the 1.58 μm band DCF 17, one having a negative wavelength dispersion corresponding to the insufficient compensation portion is used.

Alternatively, with the DCF used in the odd number optical amplifier repeaters AMP1, AMP3, . . . , if this is one where the dispersion amount for the wavelength of approximately the 1.53 μm is made a reference, then insufficient compensation is produced respectively for the 1.55 μm band and the 1.58 μm band. In this case, for the respective DCFs 16 and 17 used in the even number optical amplifier repeaters AMP2, AMP4, . . . , ones having a negative wavelength dispersion respectively corresponding to the insufficient compensation portions for the respective wavelength bands are used.

With such an optical communication system, for the odd number optical amplifier repeaters AMP1, AMP3, . . . , it is possible to have a comparatively simple construction using a single DCF. The wavelength dispersion which cannot be compensated for by these odd number optical amplifier repeaters AMP1, AMP3, . . . , is compensated for by the even number optical amplifier repeaters AMP2, AMP4, . . . , which are provided with DCFs for each of the respective wavelength bands. Consequently for the overall optical communication system, dispersion compensation can be performed for a wide band with even less DCFs, and hence an optical communication system with excellent transmission characteristics at a high speed and over a wide band can be realized at a low cost.

With the optical communication system in FIG. 10, a plurality of optical amplifier repeaters for compensating for wavelength dispersion which cannot be completely compensated for with a single DCF are positioned one after the other. However, the present invention is not limited to this, and at least one optical amplifier repeater of the plurality of optical amplifier repeaters can collectively compensate for the wavelength dispersion which has not been completely compensated for. However, since waveform distortion due to the influence of the wavelength dispersion occurs in a manner of distributed constant, then as was the abovementioned embodiments, the more frequently the dispersion compensation is performed, the better the transmission characteristics that can be obtained.

With the optical communication system in FIG. 10, each 1.58 μm band optical fiber amplifier can have an extra DCF, or a DCF providing an extra amount of dispersion compensation, to provide the additional amount of dispersion compensation required by this wavelength band. Moreover, instead of providing additional dispersion compensation in each optical fiber amplifier, the optical amplifiers can be arranged so that each even (or odd) number 1.58 µm band optical fiber amplifier has an extra DCF, or a DCF providing an extra amount of dispersion compensation. Moreover, such optical amplifiers are not intended to be limited to 1.58 µm band. Instead, the principles of the present invention are applicable to other wavelength bands.

Although the optical communication system in FIG. 10 is described as having odd and even optical amplifiers having specific characteristics, the present invention is not intended to being limited to this specific arrangement of odd and even optical amplifiers. Instead, various combinations of the different types of optical amplifiers can be arranged along the transmission line. For example, a transmission line with only a single optical amplifier of a different type than the other optical amplifiers along the transmission line might operate sufficiently for certain applications.

Furthermore, with the above embodiments of the present invention, examples are described where the WDM signal light is demultiplexed into two wavelength bands of 1.55 µm and 1.58 µm. However, the present invention is not limited to being multiplexed into two wavelength bands, or to any specific wavelength bands. Instead, for example, the WDM signal light may be demultiplexed into wavelength bands other than those mentioned above or into three or more wavelength bands. The various embodiments of the present invention can then be easily modified in view of the required number of wavelength bands.

Figure 13:
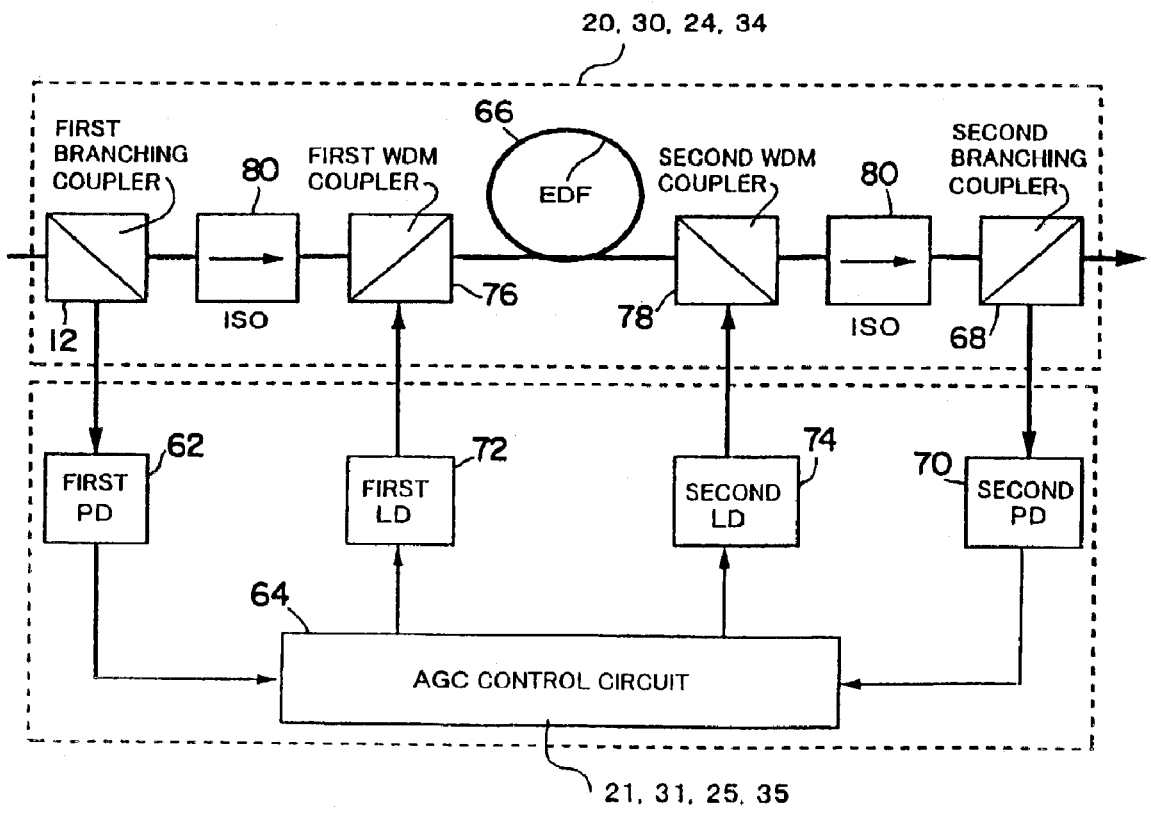
FIG. 13 is a diagram showing an optical fiber amplifier with and an AGC circuit, according to an embodiment of the present invention.

FIG. 13 is a diagram showing an example of optical fiber amplifier with an AGC circuit, according to an embodiment of the present invention. More specifically FIG. 13 shows an example of the respective optical fiber amplifiers and the AGC circuit shown, for example, in FIGS. 3, 4, 6–9, and 11.

Referring now to FIG. 13, the light of respective wavelength bands input from the left is branched by a first branching coupler 12, received by a first photodiode (PD) 62, and the input light level is detected by an AGC control circuit 64. On the other hand, the light sent to an erbium doped fiber (EDF) 66 and amplified is branched by a second branching coupler 68, received by a second PD 70, and the output light level is detected by AGC control circuit 64.

AGC control circuit 64 controls the light output level of a first laser diode (LD) 72 and a second LD 74 serving as excitation light sources for exciting EDF 66, based on the light level received by first PD 62 and second PD 70, so that the gain of the optical fiber amplifier becomes a predetermined gain (normally a constant gain). The outputs from first LD 72 and second LD 74 are respectively input to EDF 66 by a first WDM coupler 76 and a second WDM coupler 78.

Optical isolators (ISO) 80 are respectively provided between first branching coupler 12 and first WDM coupler 76, and between second WDM coupler 78 and second branching coupler 68. First LD 72 and second LD 74 can be, for example, a 0.98 µm band laser and a 1.48 µm band laser, respectively. Although the present invention is not intended to be limited to any specific wavelengths or wavelength bands, in various embodiments of the present invention described herein, it is preferable to use a 0.98 µm band laser for first LD 72, and a 1.48 µm band laser for second LD 74, to amplify signals in the wavelength bands described in examples herein.

FIG. 13 represents only one example of an optical amplifier with an AGC function. The present invention is not intended to be limited to this specific example, and many different variations are possible.

Variable optical attenuators in which the light attenuation amount can be varied by electrical control can be used as the variable optical attenuators of FIGS. 3, 4, 6–9 and 11. For example, it is desirable to use an optical attenuator wherein the attenuation amount can be varied by controlling a Faraday rotation angle of a magneto-optic crystal. However, the variable optical attenuators are not intended to be limited to such examples, and different types of variable optical attenuators can be used.

As described above, an optical amplifier can perform amplification by demultiplexing wide band light into a plurality of wavelength bands, while incorporating a wavelength dispersion compensator inside the optical amplifier which can compensate for wavelength dispersion for the respective wavelength bands.

In addition, by inputting lights of adjacent bands from different end portions of a dispersion compensating fiber, and making the propagation directions of the lights of the respective wavelength bands inside the dispersion compensating fiber opposite, then the occurrence of the nonlinear optical effects inside the dispersion compensating fiber is reduced, enabling stabilization of the transmission characteristics.

Furthermore, in the case where the dispersion compensation for the respective wavelength bands cannot be completely compensated for by a single wavelength dispersion compensator, by providing a second wavelength dispersion compensator which separately compensates for the wavelength dispersion which could not be compensated for, for each wavelength band, dispersion compensation for all of the wavelength bands can be performed inside a single optical amplifier.

According to the above embodiments of the present invention, a DCF is used as a dispersion compensator. However, the present invention is not intended to be limited to the use of a DCF. Instead, other types of dispersion compensators can be used in various embodiments of the present invention.

With an optical communication system according to embodiments of the present invention, then of the plurality of optical amplifier repeaters, for the optical amplifier repeaters having a first construction, a comparatively simple construction can be achieved by using a single wavelength dispersion compensator. With the wavelength dispersion which could not be compensated for by these optical amplifier repeaters, by performing separate compensation for each wavelength band, in the optical amplifier repeaters of a second construction, then dispersion compensation can be performed with respect to the respective wavelength bands for all of the plurality of optical amplifier repeaters. Consequently, it is possible to realize a low cost for an optical communication system incorporating a wavelength dispersion compensation function.

With a wavelength dispersion compensation method for wavelength division multiplexed signal light of the present invention, by inputting signal lights of adjacent wavelength bands from different ends of a dispersion compensating fiber so that the propagation directions of the respective signal lights inside the dispersion compensating fiber are in opposite directions, the probability of the occurrence of nonlinear optical effects in the dispersion compensating fiber can be reduced, so that stabilized transmission characteristics can be obtained.

Optical amplifiers according to the above embodiments of the present invention relate, for example, to a case where amplification processing is performed for WDM signal light transmitted at, for example 10 Gb/s, with a transmission speed in excess of 2.5 Gb/s per unit wavelength, and wavelength dispersion compensation is performed inside the optical, amplifier. However, the embodiments of the present invention are not limited to such specific examples. For example, the embodiments of the present invention are not limited to such transmission speeds.

According to the above embodiments of the present invention, an optical amplifier includes respective optical fiber amplifiers for amplifying different wavelength bands. For example, in various embodiments of the present invention, the optical amplifier includes a 1.58 μm band optical fiber amplifier 3 for amplifying signals in the 1.58 μm band, and a 1.55 μm band optical fiber amplifier 2 for amplifying signals in the 1.55 μm band. However, the embodiments of the present invention are not intended to be limited to having two optical fiber amplifiers for two wavelength bands. Instead, the embodiments of the present invention can have a plurality of optical fiber amplifiers for amplifying a plurality of wavelength bands. Thus, the present invention is not limited to any specific number of wavelength bands.

Further, according to various aspects of the present invention, all the components of the optical amplifier can be enclosed in the same housing. For example, in FIG. 3, 1.58 μm band optical fiber amplifier 3, 1.55 μm band optical fiber amplifier 2, DCF 11, and WDM couplers 10 and 12 can be enclosed in the same housing. WDM couplers 1 and 4 could also be enclosed in the housing, if desired. By enclosing the components in a single housing, the overall apparatus can be packaged and sold as a discrete component optical amplifier. Moreover, if the housing is made of an appropriate material, the optical amplifier could be used in optical submarine systems.

In addition, in various embodiments of the present invention, the pre-stage optical amplifier section of the optical amplifier preferably outputs a signal with sufficient power so as to be received by the post-stage optical amplifier section without requiring further amplification between the stages. This way, further amplification is not requires between the stages. In addition, preferably, the pre-stage optical amplifier section and the post-stage optical amplifier section of each optical amplifier are connected together without SMF between the sections. For example, in FIG. 3, preferably, DCF 11 is between the pre-stage optical amplifier section and the post-stage optical amplifier section, without SMF between the sections.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical communication system comprising:
   a plurality of transmitters transmitting lights at different wavelengths, respectively;
   a multiplexer multiplexing the lights at different wavelengths together into a WDM light, and providing the WDM light to an optical transmission line;
   a plurality of optical amplifiers arranged along the transmission line to amplify the WDM light traveling through the transmission line;
   a demultiplexer demultiplexing the WDM light transmitted through the transmission line and the plurality of optical amplifiers into the lights at different wavelengths; and
   a plurality of receivers receiving the lights demultiplexed by the demultiplexer, wherein
   the plurality of optical amplifiers include a first-type optical amplifier and a second-type optical amplifier,
   the first-type optical amplifier includes
      a first amplification stage demultiplexing the WDM light into first and second lights, separately amplifying the first and second lights, and multiplexing the amplified first and second lights together into a multiplexed light,
      a dispersion compensator compensating for dispersion in the multiplexed light, and
      a second amplification stage demultiplexing the dispersion compensated, multiplexed light into the first and second lights, separately amplifying the demultiplexed first and second lights, and multiplexing the separately amplified first and second lights into a WDM light which is provided to the transmission line, and
   the second-type optical amplifier includes
      a demultiplexer demultiplexing the WDM light into the first and second lights,
      a first amplification stage amplifying the demultiplexed first light, providing dispersion compensation to the amplified first light, and amplifying the dispersion compensated first light, to output a first stage light,
      a second amplification stage amplifying the demultiplexed second light, providing dispersion compensation to the amplified second light, and amplifying the dispersion compensated second light, to output a second stage light, and
      a multiplexer multiplexing the first and second stage lights together into a WDM light provided to the optical transmission line.

2. An optical communication system comprising:
   a plurality of transmitters transmitting lights at different wavelengths, respectively;
   a multiplexer multiplexing the lights, at different wavelengths together into a WDM light, and providing the WDM light to an optical transmission line;
   a plurality of optical amplifiers arranged along the transmission line to amplify the WDM light traveling through the transmission line;
   a demultiplexer demultiplexing the WDM light transmitted through the transmission line and the plurality of optical amplifiers into the lights at different wavelengths; and
   a plurality of receivers receiving the lights demultiplexed by the demultiplexer, wherein
   the plurality of optical amplifiers include a first-type optical amplifier and a second-type optical amplifier,
   the first-type optical amplifier includes
      means for demultiplexing the WDM light into first and second lights, for separately amplifying the first and second lights, and for multiplexing the amplified first and second lights together into a multiplexed light,
      means for compensating for dispersion in the multiplexed light, and
      means for demultiplexing the dispersion compensated, multiplexed light into the first and second lights, for separately amplifying the demultiplexed first and second lights, and for multiplexing the separately amplified first and second lights into a WDM light which is provided to the transmission line, and the second-type optical amplifier includes means for demultiplexing the WDM light into the first and second lights, means for amplifying the demultiplexed first light, for providing dispersion compensation to the amplified first light, and for amplifying the dispersion compensated first light, to output a first stage light, means for amplifying the demultiplexed second light, for providing dispersion compensation to the amplified second light, and for amplifying the dispersion compensated second light, to output a second stage light, and means for multiplexing the first and second stage lights together into a WDM light provided to the optical transmission line.

* * * * *

UNITED STATES PATENT AND TRADEMARK OFFICE
CERTIFICATE OF CORRECTION

PATENT NO. : 6,943,940 B2
APPLICATION NO. : 10/322584
DATED : September 13, 2005
INVENTOR(S) : Susumu Kinoshita et al.

It is certified that error appears in the above-identified patent and that said Letters Patent is hereby corrected as shown below:

Column 18,
Line 39, delete "lights," and insert -- lights --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,943,940 B2 |
| APPLICATION NO. | : 10/322584 |
| DATED | : September 13, 2005 |
| INVENTOR(S) | : Susumu Kinoshita et al. |

It is certified that error appears in the above-identified patent and that said Letters Patent is hereby corrected as shown below:

On the cover page, insert:

--(30) Foreign Application Priority Data, September 3, 1998 (JP) 10-249658--

Signed and Sealed this

Second Day of January, 2007

JON W. DUDAS
*Director of the United States Patent and Trademark Office*